Patented Feb. 19, 1929.

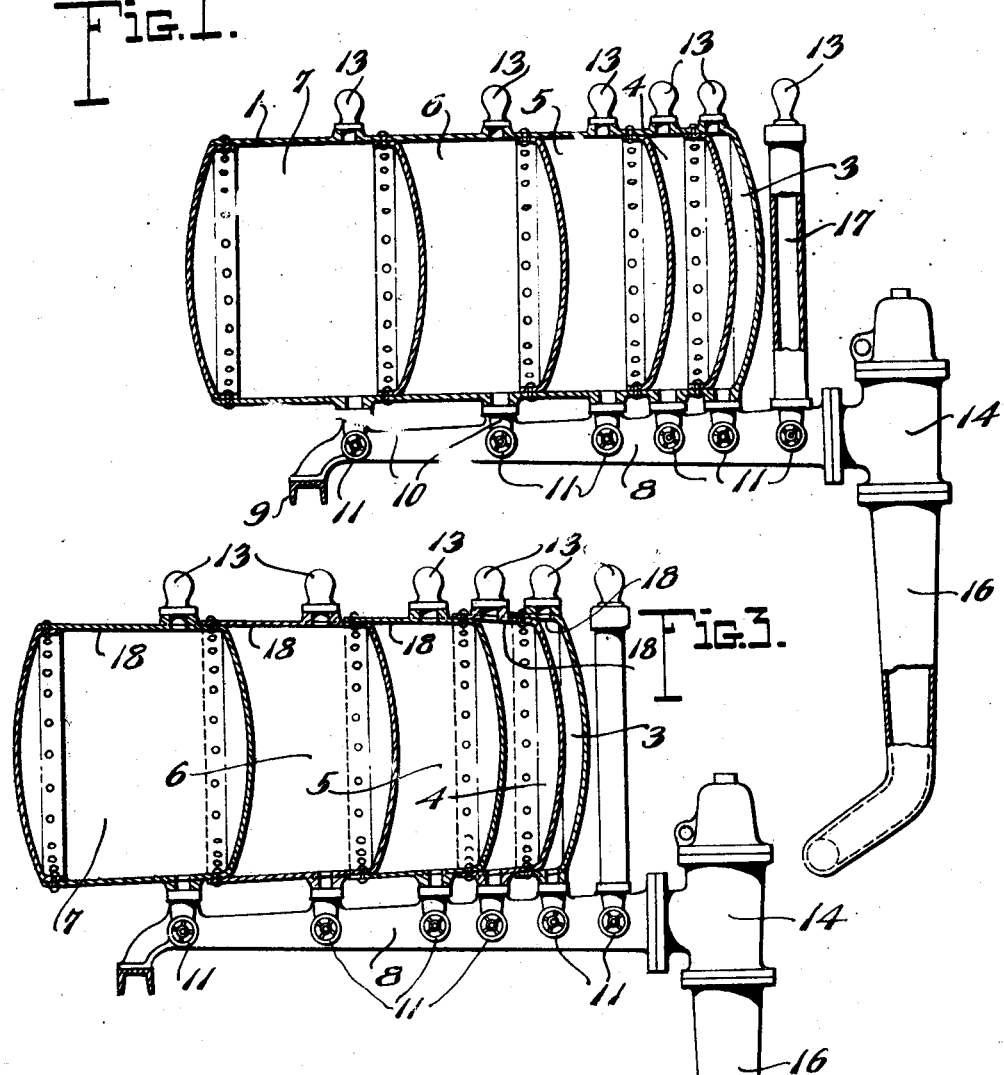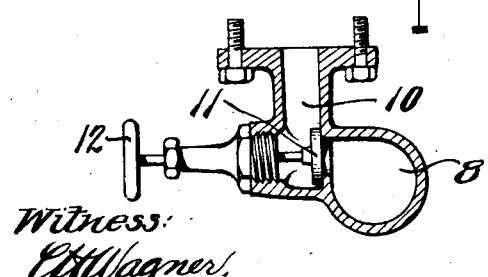

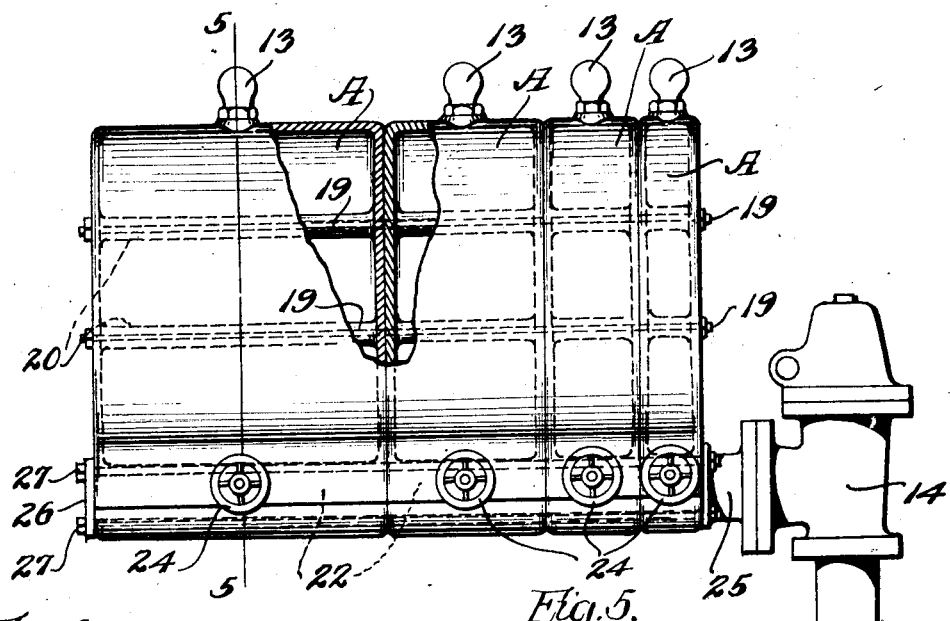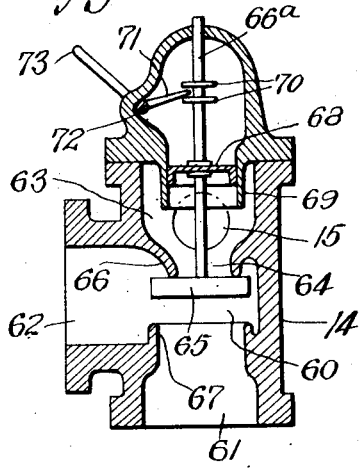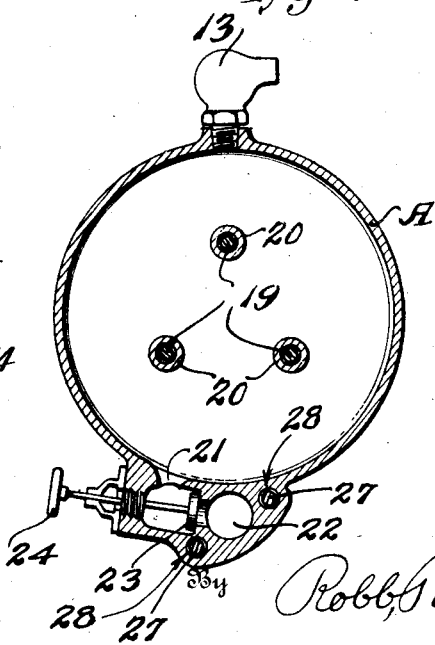

1,702,898

UNITED STATES PATENT OFFICE.

FERDINAND H. HEINE, OF MILWAUKEE, WISCONSIN, ASSIGNOR TO KOEHRING COMPANY, OF MILWAUKEE, WISCONSIN, A CORPORATION.

SECTIONAL WATER-MEASURING TANK.

Application filed May 26, 1922. Serial No. 563,846.

In the mixing of different materials, such as concrete, in which some liquid such as water is used, it is frequently desirable or even necessary that the quantity of water entering into each batch of the mixture be measured accurately, and that means be provided for varying or regulating the quantity of water entering into each batch, depending upon the amount of moisture in the other materials, and also upon the size of the batch.

With the above considerations in view the invention has for its object to provide a water measuring tank which embodies novel features of construction, whereby it can be regulated or adjusted to supply different quantities of water to the batches of material being mixed. The water is accurately measured and the quantity of water entering into each batch of the mixture can be regulated as may be necessary or desirable.

For the purpose of illustrating the idea of the invention, certain preferred embodiments thereof have been shown on the drawing and will be described in the specification, although it will be understood that many modifications and changes can be made in the details of construction without departing from the spirit of the invention.

For a full understanding of the invention reference is to be had to the following description and accompanying drawings, in which:

Figure 1 is a side elevation of a water measuring tank which is constructed in accordance with the invention, portions being broken away and shown in section to illustrate more clearly the details of construction.

Figure 2 is a transverse sectional view through the manifold, showing one of the regulating valves.

Figure 3 is a view similar to Figure 1, showing a slight modification of the invention.

Figure 4 is a side elevation showing a further modification of the invention.

Figure 5 is a transverse sectional view on the line 5—5 of Figure 4.

Figure 6 is a sectional view through the three-way valve showing the interior construction thereof. Figure 7 is a sectional view through one of the check valves which is provided at the top of each of the compartments.

Corresponding and like parts are referred to in the following description and indicated on all of the views of the drawing by like reference characters.

Referring more specifically to the embodiment of the invention which is illustrated by Figure 1 of the drawings, the numeral 1 designates a water tank which has the interior thereof subdivided by the transverse walls or partitions 2 into a plurality of independent compartments 3, 4, 5, 6 and 7. These several compartments are of different sizes and preferably progress geometrically in capacity, so that by selecting any single compartment or any combination of compartments the operator can set the device to deliver the exact quantity of water which is desired. For instance, the various compartments may have capacities of one gallon, two gallons, four gallons, eight gallons and sixteen gallons, respectively, and with this arrangement the operator can get any desired quantity of water from one gallon to thirty-one gallons, as he may desire. The tank itself may be formed in any suitable manner, although in this particular embodiment of the invention it is illustrated as comprising a cylindrical casing or outer shell within which the different transverse walls 2 are arranged and riveted or otherwise secured in position.

Extending under the tank 1 is a manifold 8 which is suitably supported upon the frame members 9 of a concrete mixer or other device in connection with which the water tank may be employed. The manifold is formed with a plurality of lateral arms 10 which communicate with the different compartments of the tank at the bottom thereof. Each of the arms of the manifold is provided with a valve 11 which controls communication between the said arm and the main passage of the manifold. The valves are controlled by handles 12 which project from the side of the manifold, and by suitably manipulating these handles the valves can be set to utilize any selected compartment or combination of compartments, as may be necessary to discharge the desired quantity of water. The top of each compartment is provided with a conventional check valve 13, said check valves opening to permit the escape of air when the compartments are being filled with water and also opening to permit the ingress of air when the compartments are being emptied.

The manifold 8 communicates through a three-way valve mechanism 14 with a supply member 15 and a discharge pipe 16. The latter may extend downwardly and have a laterally deflected end arranged to deliver the water into the interior of a mixing drum or the like. The three-way valve may be of any suitable or conventional construction and may be arranged for either manual operation or automatic operation. When the valve is moved in one direction it establishes communication between the manifold 8 and the discharge pipe 16, with the result that the water in such of the compartments of the tank as have the valves 11 therefor in an open position will drain by gravity through the manifold and three-way valve into the discharge pipe 16. When the three-way valve is moved into another position it establishes communication between the manifold 8 and the supply member 15, so that water will enter the manifold through the three-way valve and flow upwardly into those of the compartments of the tank for which the valves 11 have been opened, thereby filling the compartments and in this manner measuring the quantity of water which will be discharged from the tank when the three-way valve is turned into a discharging position. The check valves 13 are of such a construction that they permit the escape of air but will not permit the escape of the water, and the flow of water is thus stopped when the selected compartments of the tank have been filled. While the check valves 13 may be of any suitable construction, one form of check valve which is suitable for use is shown in detail by Figure 7. The valve casing has an opening 50 in the top thereof and a spherical valve 51 which is formed of some light material so that it will float is arranged in the valve casing. The valve 51 normally drops by gravity away from the opening 50 so that air can readily escape through the valve, although when the compartment becomes filled with water and enters the valve casing through the passage in the bottom thereof, the valve 51 will float in the water and be raised thereby into engagement with the top of the valve casing. The valve casing is so shaped that when the float valve 51 is thus raised it closes the opening 50 and prevents the escape of water.

An additional water compartment has been provided by a length of pipe 17 which connects with an extra arm on the manifold. This short length of pipe may have a smaller capacity than that of the smallest tank compartment, for instance, a capacity of one-half gallon. This enables the quantity of water entering the mixture to be measured with greater accuracy.

A slight modification is shown by Figure 3, in which the tank is formed in dish shaped sections 18 which are assembled in a partially telescoping relation and riveted together. These tank sections may be pressed from steel in the well known manner, and the arrangement is such as to provide a number of compartments of different capacities, as in the previous instance. The manifold and associated parts have the same construction that was previously described, and the manner of operation is identical.

A further modification is shown by Figures 4 and 5, in which the tank is formed of a series of units A which are of different capacities, and which are clamped together in an end to end relation. The manifold is formed in connection with the units instead of being separate therefrom. Each of the units A is complete in itself and the body portions of the units are provided with corresponding flue members 19 which extend transversely through the same and through which tie bolts 20 are inserted for the purpose of fastening the units together. Each of the units is provided at the top thereof with one of the check valves 13, and at the bottom thereof with a passage 21 leading into a manifold opening 22. The passage is controlled by a valve 23 which can be opened and closed by a handle 24 in the outside of the tank. When the several units are assembled the manifold openings 22 thereof register with each other to provide a complete manifold which extends the full length of the tank. A fitting 25 connects one end of the manifold opening to the three-way valve 14, while a cap member 26 closes the opposite end of the manifold opening. Tie bolts 27 extend through openings 28 which are arranged in the lower ends of the tank units on opposite sides of the manifold openings, and these bolts engage the fitting 25 and cap 26 to hold the latter in position. The tie bolts also clamp the tank units securely together so that a water tight connection is provided between the various manifold openings 22. Any desired number of the tank units A can be assembled in forming a tank, and these units may be of different capacities as required to give the most satisfactory results. The three-way valve, discharge pipe and supply member are identical in construction with those which were used in connection with the previously described embodiments of the invention, the three-way valve being adapted to be actuated either manually, automatically or semi-automatically to intermittently fill selected units of the tank and discharge the same into the drum or mixing device containing the batches being mixed. By adjusting the valves 23 any selected tank unit or combination of tank units can be used and the quantity of water entering into each batch of the mixture can be accurately measured and regulated.

The three-way valve may be of any suitable or preferred construction, such as that disclosed in Patent No. 1,525,100 which was granted on February 3, 1905, to Erich H. Lichtenberg.

Referring to Figure 6, which is a sectional view through the three-way valve 14, the reference numeral 60 designates a lower chamber which communicates through a downwardly extending passage 61 with the outlet pipe 16 and also communicates through a lateral passage 62 with the manifold 8. The inlet pipe 15 communicates with an upper chamber 63 which is connected to the lower chamber 60 by a passage 64. A valve 65, which is carried by a vertically movable valve stem 66$^a$ is movable up and down within the lower chamber 60. When the valve is in a raised position it engages a valve seat 66 and cuts off communication between the upper chamber 63 and the lower chamber 60, although the lower chamber is in open communication with both the downwardly extending passage 61 and the lateral passage 62. When the valve is in this position the manifold is in communication with the outlet pipe and communication between the inlet pipe and the manifold is cut off. When the valve 65 is moved downwardly into engagement with the valve seat 67 the upper and lower chambers of the valve casing are in communication with each other and the manifold is in communication with the inlet pipe 15, although communication between the manifold and the outlet pipe is cut off. The valve stem 66$^a$ extends upwardly from the valve 65 and is provided with a piston 68 which operates within a cylindrical guide 69. The area of the piston 68 is greater than the cross section of the passage 64, so that when the valve 65 is in a raised position the pressure of the water in the upper chamber 63 of the valve casing will hold the valve 65 in a raised position. It will also be observed that the area of the piston 68 is less than the cross sectional area at the upper end of the vertical passage 61, so that when the valve 65 is in a lowered position the pressure of the water within the valve casing will hold the valve on its seat. The upper end of the valve stem 66$^a$ may be provided with spaced collars 70 between which an arm 71 which is mounted on a rock shaft 72 projects. The rock shaft may be manipulated in any suitable manner, as by means of a handle 73, to move the valve stem up or down and shift the position of the valve 65 and, as the said valve 65 is moved up and down the manifold 8 is alternately placed in communication with the intake pipe 15 and discharge pipe 16.

Having thus described my invention what I claim as new and desire to secure by Letters Patent is:

1. A liquid measuring tank of the character described, including a tank having a plurality of compartments, a single manifold communicating with the several compartments of the tank, independent valves controlling communication between each of the tank compartments and the manifold whereby any selected one of the compartments can be placed in or out of communication with the common manifold independently of the other compartments, a common filling pipe, a common discharge pipe, and a single valve at the intersection of the manifold with the filling pipe and discharge pipe for selectively placing the manifold in communication with either the filling pipe or the discharge pipe, the quantity of liquid which is discharged at each operation of the last mentioned valve being selectively determined by the number of the tank compartments which are in communication with the manifold.

2. A liquid measuring tank of the character described, including a tank having a plurality of independent units arranged side by side and of different sizes which progress geometrically in capacity, a common manifold communicating with the several tank units, independent valves controlling communication between the manifold and the respective tank units and enabling each of the tank units to be placed in filling communication with the manifold and discharged into the manifold independently of the other tank units, a common filling pipe, a common discharge pipe, and a single valve for alternately placing the manifold in communication with the common filling pipe and common discharge pipe, the quantity of liquid discharged at each operation of the valve being determined by the number and size of those of the compartments which are in communication with the manifold and a large variation in the quantity discharged being possible because the sizes of the tank units are such that they progress geometrically in capacity.

3. A liquid measuring tank of the character described, including a tank having a plurality of independent units, a common manifold extending under the several tank units and having independent communication with the various units at the bottom thereof, independent valves controlling communication between the manifold and the respective tank units and enabling each of the tank units to be placed in filling communication with the manifold and discharged into the manifold independently of the other tank units, a check valve at the top of each compartment for permitting the escape of air and preventing the escape of liquid, a common filling pipe, a common discharge pipe, a single three-way valve at the intersection of the manifold with the filling pipe and discharge pipe, whereby any selected tank unit or group of tank units can be alternately filled or discharged by gravity, the quantity of liquid discharged at each operation of the last mentioned valve being selectively determined by the number of tank compartments which are in communication with the manifold.

4. A liquid measuring tank of the character described, formed of a plurality of independent tank units adapted to be assembled in end to end relation, said tank units being formed with corresponding manifold units which register with each other to provide a composite manifold extending the complete length of the assembled units, and the manifold portion of each tank unit communicating through an opening with the interior of the tank unit, valves controlling communication between each of the manifold openings and the tank units, a filling member, a discharge pipe and a three-way valve for alternately establishing communication between the manifold and the discharge pipe to first fill selected tank units and then discharge the contents thereof.

5. A liquid measuring tank of the character described, including a tank formed of a plurality of independent tank units adapted to be assembled in an end to end relation and provided with corresponding bolt openings, the units being also formed with corresponding manifold portions which register with each other when the tank units are assembled to provide a composite manifold extending the full length of the assembled units, independent valves intermediate each tank and manifold unit, a cap closing one end of the manifold, a fitting in the opposite end of the manifold, tie bolts extending through the openings of the units and engaging the cap and fitting to hold the parts in an assembled relation, a three-way valve applied to the fitting, a filling member connected with the three-way valve, and a discharge pipe connected with the three-way valve, the said three-way valve serving to alternately place the manifold into communication with the filling member and the discharge pipe.

6. A liquid measuring tank of the class described, comprising, in combination, a tank formed of independent tank units fitted together in abutting relation, said tanks being formed with corresponding manifold units which register with each other when the tank units are assembled to provide a composite manifold extending the full length of the assembled units, the manifold units communicating with the interior of the respective tank units, and valves controlling communication between each of the manifold units and the respective tank units, whereby any one of the tank units may selectively be put into or cut out of communication with the composite manifold so that one or a combination of tank units may be filled or emptied as desired.

7. A liquid measuring tank of the character described, including a tank formed of independent units, each of said units being formed with a manifold portion open for free flow of liquid, and adapted to cooperate with similar manifold portions of adjacent units whereby tank units may be added to or taken away from the composite tank as occasion demands, means for assembling the tank units into a unitary structure with the manifold portions cooperating with each other to provide a single manifold for the assembled units, and means for controlling inlet and outlet flow from each tank unit to its associated manifold whereby each of the tank units may selectively be put into or cut out of communication with the composite manifold for the assembled unit.

In testimony whereof I affix my signature.

FERDINAND H. HEINE.